(12) United States Patent
Kim et al.

(10) Patent No.: US 9,117,395 B2
(45) Date of Patent: Aug. 25, 2015

(54) METHOD AND APPARATUS FOR DEFINING OVERLAY REGION OF USER INTERFACE CONTROL

(75) Inventors: Seung-Hyun Kim, Gyeonggi-do (KR); Kyoung-Yong Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 594 days.

(21) Appl. No.: 13/451,155

(22) Filed: Apr. 19, 2012

(65) Prior Publication Data

US 2012/0268487 A1 Oct. 25, 2012

Related U.S. Application Data

(60) Provisional application No. 61/477,012, filed on Apr. 19, 2011.

(30) Foreign Application Priority Data

Apr. 13, 2012 (KR) .................. 10-2012-0038497

(51) Int. Cl.
*G09G 5/00* (2006.01)
*G09G 5/14* (2006.01)

(52) U.S. Cl.
CPC .............. *G09G 5/14* (2013.01); *G09G 2340/12* (2013.01); *G09G 2340/145* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,509,913 B2 | 1/2003 | Martin, Jr. et al. | |
| 7,590,947 B1 | 9/2009 | Gay et al. | |
| 2001/0035870 A1 | 11/2001 | Takeuchi et al. | |
| 2003/0137539 A1* | 7/2003 | Dees | 345/762 |
| 2004/0235464 A1 | 11/2004 | Korkalo et al. | |
| 2007/0030263 A1 | 2/2007 | Lee et al. | |
| 2007/0175998 A1* | 8/2007 | Lev | 235/454 |
| 2007/0283292 A1 | 12/2007 | Bucher et al. | |
| 2009/0199252 A1* | 8/2009 | Wieczorek et al. | 725/105 |
| 2011/0273540 A1* | 11/2011 | Lee et al. | 348/51 |

FOREIGN PATENT DOCUMENTS

| | | |
|---|---|---|
| EP | 2 086 236 | 8/2009 |
| JP | 2004-302730 | 10/2004 |
| JP | 2004350054 | 12/2004 |
| KR | 1020070017003 | 2/2007 |
| KR | 1020080000103 | 1/2008 |

OTHER PUBLICATIONS

European Search Report dated Jul. 7, 2015 issued in counterpart application No. 12774837.4-1954.

* cited by examiner

*Primary Examiner* — David H Chu
(74) *Attorney, Agent, or Firm* — The Farrell Law Firm, P.C.

(57) ABSTRACT

Disclosed are a method and an apparatus for defining an overlay region for an application in a user interface control region on a screen of a display in a mobile device. The application queries a platform about an overlay region desired to be generated based on a basic resolution set in the application. The platform calculates an approximate region satisfying an overlay region condition for the queried overlay region and informs the application of the approximate region. Thereafter, the application generates an overlay region corresponding to the approximate region, and the platform displays the generated overlay region on the screen.

21 Claims, 5 Drawing Sheets

METHOD AND APPARATUS FOR DEFINING OVERLAY REGION OF USER INTERFACE CONTROL

PRIORITY

This application claims priority under 35 U.S.C. §119 to a U.S. Provisional Patent Application Ser. No. 61/477,012, which was filed in the USPTO on Apr. 19, 2011, and Korean Patent Application Serial No. 10-2012-0038497, which was filed in Korean Intellectual Property Office on Apr. 13, 2012, the contents of each of which are incorporated herein by reference.

BACKGROUND OF THE INVENTION

1. Field of the Invention

The present invention relates generally to a mobile device, and more particularly, to a method and an apparatus for generating an overlay region for an application in a User Interface (UI) control.

2. Description of the Related Art

A user of a mobile device generally uses applications installed in the mobile device by a manufacturer or a seller. If desired applications are not installed in the mobile device, the user can download and install them from an external source. Applications refer to various types of application programs installed in and executed by the mobile device, such as a notebook computer, a tablet computer, a mobile phone, a smart phone, a PDA (Personal Digital Assistant), an MP3 (MPEG-1 Audio Layer-3) player, a PMP (Portable Multimedia Player), and a digital camera.

The application executed in the mobile device generates an overlay region for a UI relevant to the corresponding application in a UI region on a display screen and uses the generated overlay region, which is used to display various images according to the corresponding application on the screen. When a display of the mobile device is a touch screen panel display, the overlay region is used to receive an input generated by user contact of a touch screen on the overlay region.

Each application generally has one resolution, which is set by a developer of the application, as a basic resolution among various resolutions such as a WVGA (Wide Video Graphic Array), an HVGA (Half Video Graphic Array), and a WQVGA (Wide Quarter Video Graphic Array). The WVGA corresponds to 480*800 pixels, the HVGA corresponds to 320*480 pixels, and the WQVGA corresponds to 240*400 pixels. Accordingly, the applications can have different basic resolutions.

The mobile device usually has a fixed physical resolution, and should thus process an image of the overlay region in a manner suitable for displaying the image based on the fixed physical resolution. The processing of the image of the overlay region includes, but is not limited to color converting, scaling, and rotating.

In the application, a position, width, and height of the overlay region can be freely defined based on the basic resolution, i.e., within the basic resolution. For example, when the basic resolution is the WVGA, the overlay region can be defined within 480*800 pixels.

However, the image processing of the overlay region in the mobile device may have several restrictive conditions. For example, the width, height, or position of the overlay region may be limited after scaling the overlay region according to the physical resolution of the mobile device.

Such an overlay region condition may not be satisfied when an aspect ratio of the basic resolution of the application is different from an aspect ratio of the physical resolution of the mobile device or the basic resolution of the application is different from the physical resolution of the mobile device. Particularly, when the mobile device scales the overlay region generated by the application in accordance with the physical resolution of the mobile device, if the overlay region condition is not satisfied, the image processing may not be performed properly. Even if the basic resolution of the application is equal to the physical resolution of the mobile device, the image processing is not normally performed when the generated overlay region does not satisfy the overlay region condition.

Accordingly, it is difficult to develop an application, which can be mutually shared between various mobile devices having different physical resolutions among various physical resolutions. In other words, the mobile device may be unable to use an application, which cannot satisfy the overlay region condition related to the image processing of the corresponding mobile device.

SUMMARY OF THE INVENTION

Accordingly, the present invention provides a method and an apparatus for defining an overlay region, which can enable the overlay region of an application to be generated regardless of a physical resolution of a mobile device and a basic resolution of the application to be used in the mobile device.

Further, the present invention provides a method and apparatus for defining an overlay region, which can enable the mobile device to use applications regardless of various basic resolutions of the applications.

In accordance with an aspect of the present invention, there is provided a method of defining an overlay region for an application in a user interface control region on a screen of a display in a mobile device, including querying, by the application, a platform of the mobile device about an overlay region desired to be generated based on a basic resolution set in the application, and generating, when the application receives an approximate region satisfying an overlay region condition preset for the queried overlay region from the platform, an overlay region corresponding to the approximate region.

In accordance with another aspect of the present invention, there is provided a method of defining an overlay region for an application in a user interface control region on a screen of a display in a mobile device, including calculating, when a platform of the mobile device is queried about an overlay region desired to be generated based on a basic resolution set in the application from the application, an approximate region satisfying an overlay region condition for the queried overlay region and informing the application of the approximate region, and displaying, when an overlay region corresponding to the approximate region is generated by the application, the generated overlay region on the screen of the display by the platform.

In accordance with another aspect of the present invention, there is provided a method of defining an overlay region in a user interface control region on a screen of a display in a mobile device by an application, including querying, by the application, a platform of the mobile device about an overlay region desired to be generated based on a basic resolution set in the application, calculating, by the platform, an approximate region satisfying an overlay region condition for the queried overlay region and informing the application of the approximate region, generating, by the application, an overlay region corresponding to the approximate region, and displaying, by the platform, the generated overlay region on the screen.

In accordance with another aspect of the present invention, there is provided an apparatus for defining an overlay region for an application in a user interface control region on a screen of a display in a mobile device, including a controller for executing the application and a platform of the mobile device, wherein the controller controls such that the application generates an overlay region corresponding to an approximate region calculated by the platform to satisfy an overlay region condition and the platform displays the overlay region on the screen.

BRIEF DESCRIPTION OF THE DRAWINGS

The above and other aspects, features and advantages of embodiments of the present invention will be more apparent from the following description taken in conjunction with the accompanying drawings, in which.

DETAILED DESCRIPTION OF EMBODIMENTS OF THE PRESENT INVENTION

Figure 1:
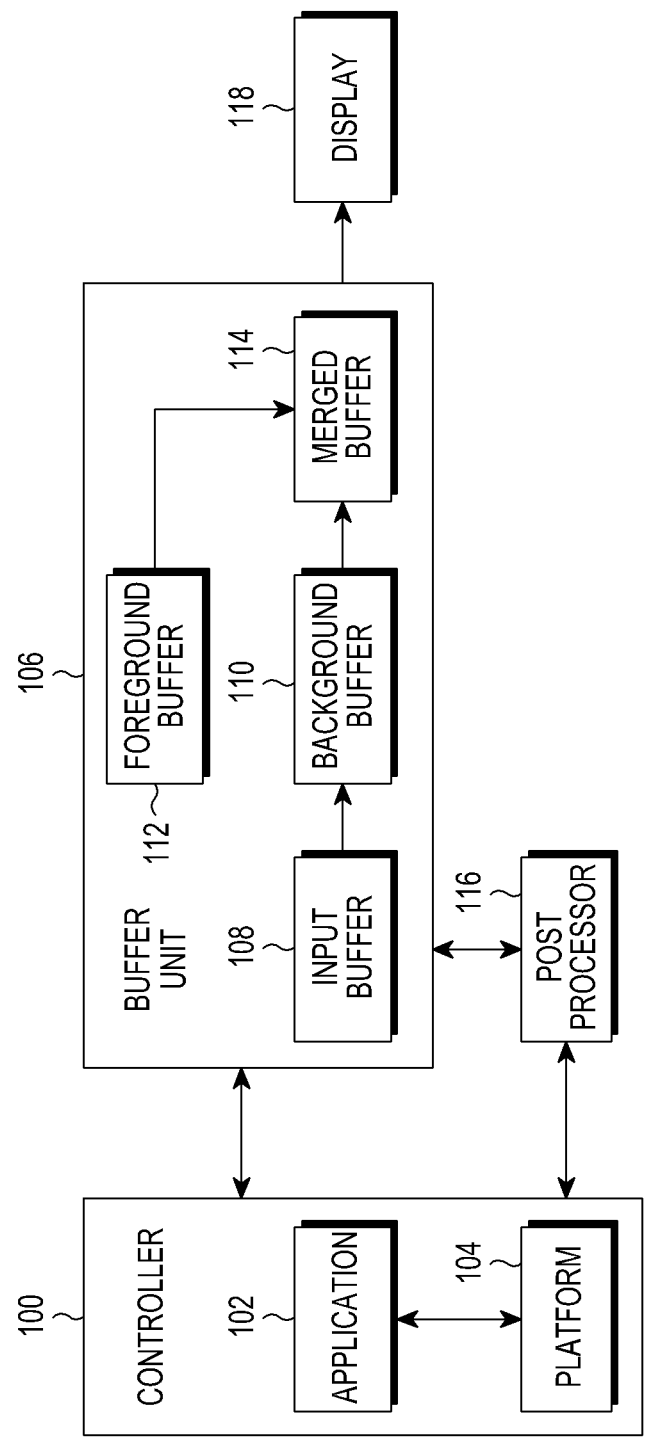
FIG. 1 illustrates a mobile device according to an embodiment of the present invention.

Hereinafter, embodiments of the present invention will be described with reference to the accompanying drawings. Various specific definitions found in the following description are provided only to help general understanding of the present invention, and it is apparent to those skilled in the art that the present invention can be implemented without such definitions. A detailed description of known functions and configurations incorporated herein will be omitted for the sake of clarity and conciseness.

The terms and words used in the following description and claims are not limited to dictionary definitions and are stated by the inventor only for the purpose of clear and consistent understanding. Therefore, the definitions should be made based on the contents of the description. In the following description, the same elements will be designated by the same reference numerals.

Although the mobile device will be described as an example herein, the embodiments of the present invention can be applied to other apparatuses having a similar technical background. Further, the embodiments of the present invention can be applied to other apparatuses through some modifications by those skilled in the art without departing from the technical spirit and scope of the present invention. For example, the embodiments of the present invention can be applied to a desktop computer or a smart TV (television) if the overlay region does not satisfy restrictive conditions of the image processing in an apparatus for displaying the overlay region generated by the application.

FIG. 1 illustrates a mobile device according to an embodiment of the present invention. The remaining elements except for elements related to displaying an overlay region generated by an application in the mobile device are omitted in FIG. 1.

Referring to FIG. 1, a controller 100 includes an application 102 and a platform 104. Although FIG. 1 illustrates only one application 102, various applications can be installed in the mobile device and executed by the controller 100. The application 102 and the platform 104 can be stored in a memory inside or outside the controller 100, and are loaded from the memory and executed by the controller 100. The application 102 generates an overlay region, which is provided to a display 118 via a buffer unit 106 under a control of the platform 104 and displayed on a screen of the display 118. The platform 104 performs an image processing for an image of the overlay region in accordance with a physical resolution of the mobile device by controlling a post processor 116. The post processor 116 is generally implemented by a hardware module for a quick image processing, but can also be implemented by a software module. The buffer unit 106 includes an input buffer 108, a background buffer 110, a foreground buffer 112, and a merged buffer 114.

Figure 2:
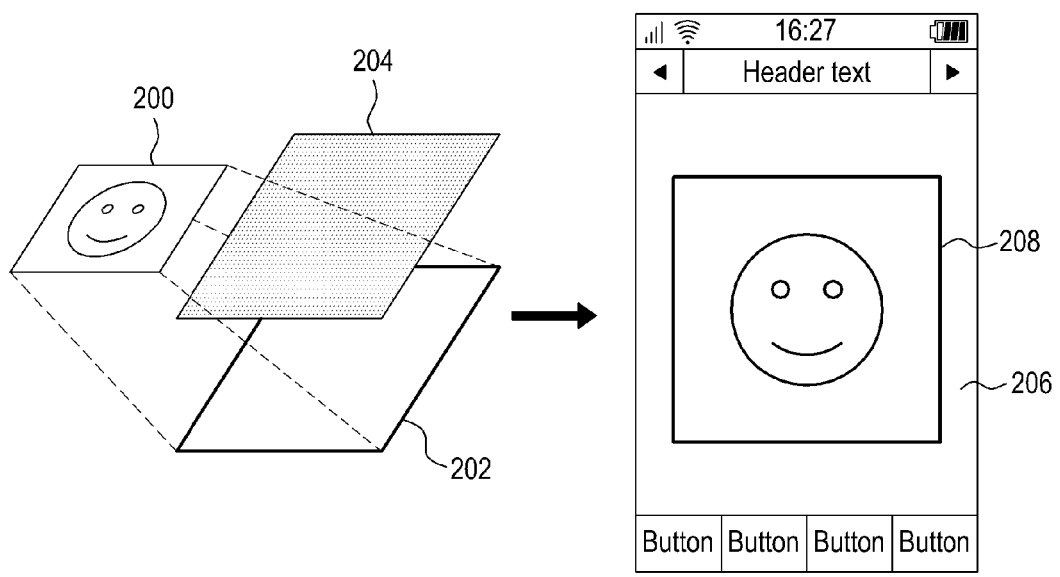
FIG. 2 illustrates an example of an overlay of a general mobile device.

FIG. 2 illustrates an example of an overlay of the general mobile device, in which the overlay region generated by the application 102 of FIG. 1 is displayed in the display 118.

Referring to FIGS. 1 and 2, the application 102 generates an overlay region 200 as shown in FIG. 2. The generated overlay region 200 is set in the input buffer 108 of the buffer unit 106. The overlay region 200 set in the input buffer 108 is image-processed by the post processor 116 under a control of the platform 104. The image-processed overlay region 202 is stored in the background buffer 110, merged with a masking color image 204 stored in the foreground buffer 112, and provided to the display 118 via the merged buffer 114. Accordingly, the overlay region 208 is displayed on a screen 206 of the display 118.

The mobile display generally has one fixed physical resolution. Accordingly, the post processor 116 should process the image of the overlay region in such a manner that the image is suitable for being displayed by the display 118 based on the fixed physical resolution. The image processing of the overlay region may include, for example, color converting, scaling, and rotating.

The color converting converts a color set in the application for the overlay region generated by the application 102 to a color supported by the mobile device. The scaling scales the overlay region generated by the application 102 to be suitable for the resolution of the mobile device according to a ratio between the basic resolution of the application 102 and the physical resolution of the mobile device. In general, when a width and a height are different in the resolution of the mobile device, such as the WVGA having 480*800 pixels, 480 pixels, which are the shorter of the two, correspond to the width and 800 pixels, which are the longer, correspond to the height. When the basic resolution of the application 102 is the WVGA (480*800 pixels) and the physical resolution of the mobile device is the HVGA (320*480 pixels), if a screen direction is set such that 480 pixels of the WVGA do not correspond to 320 pixels of the HVGA, the post processor 116 scales the overlay region 200 such that the 480 pixels of the WVGA correspond to the 320 pixels of the HVGA. The rotating rotates the overlay region 200 according to an intention of the application 102.

There may be several restrictive conditions in processing the image of the overlay region 200 by the post processor 116. For example, a width and a height or a position of the overlay region scaled according to the physical resolution of the mobile device may be limited. When the physical resolution of the mobile device is the HVGA, for example, the width and the height of the overlay region 200 after scaling may be limited to a multiple of 16. The position of the overlay region 200, that is, an X axis coordinate and an Y axis coordinate of a reference position defined by an X axis coordinate corresponding to a width axis and an Y axis coordinate corresponding to a height axis may be limited to an even number.

The overlay region condition by the post processor 116 may not be satisfied when an aspect ratio of the basic resolution of the application is different from an aspect ratio of the physical resolution of the mobile device or the basic resolution of the application is different from the physical resolution of the mobile device. Even when the basic resolution of the application is equal to the physical resolution of the mobile device, if the overlay region is generated not to satisfy the condition of the overlay region, the image processing is not normally performed.

Accordingly, the controller 100 generates the overlay region, which corresponds to an approximate region calculated by the platform 104 to satisfy the overlay region condition as described above, by the application 102, and displays the generated overlay region on the screen of the display 118 by the platform 104. The application 102 queries the platform 104 about the overlay region desired to be generated based on the basic resolution set in the application 102. The platform 104 calculates the approximate region satisfying the overlay region condition for the overlay region queried by the application 102 and informs the application 102 of the approximate region.

Figure 3:
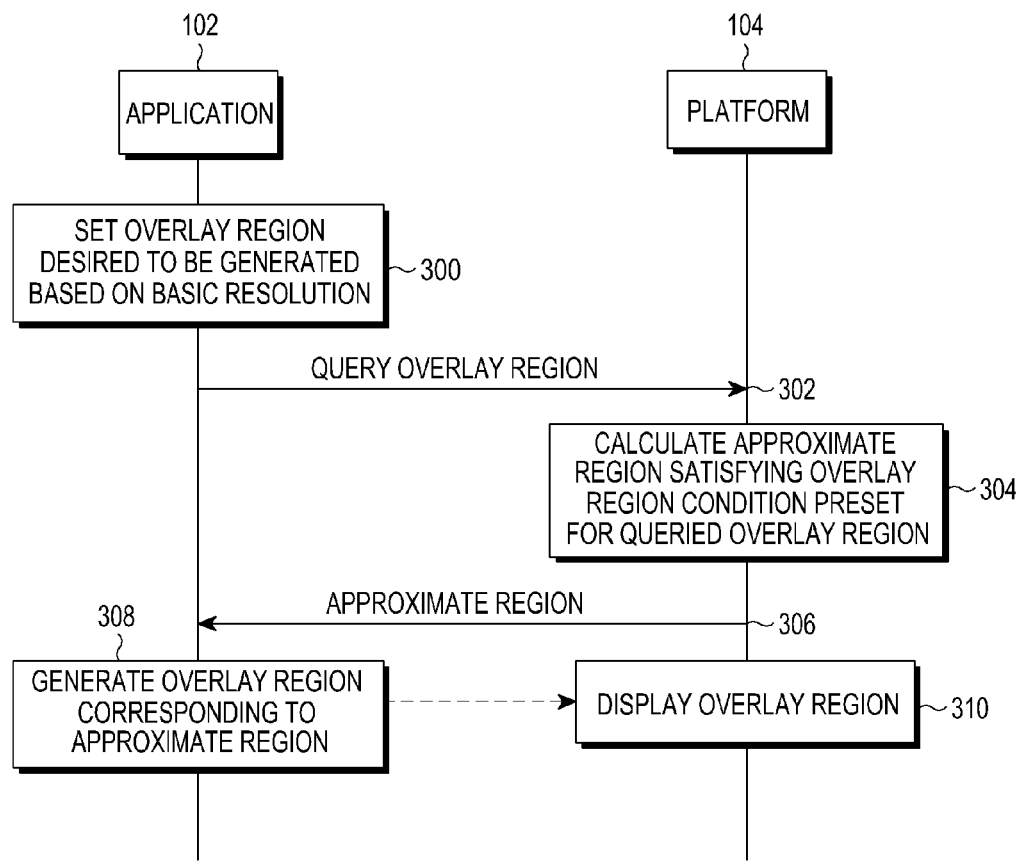
FIG. 3 describes an overlay region according to an embodiment of the present invention.

FIG. 3 describes an overlay region according to an embodiment of the present invention. FIG. 3 describes processes mutually performed between the application 102 and the platform 104 of the controller 100.

Figure 4A:
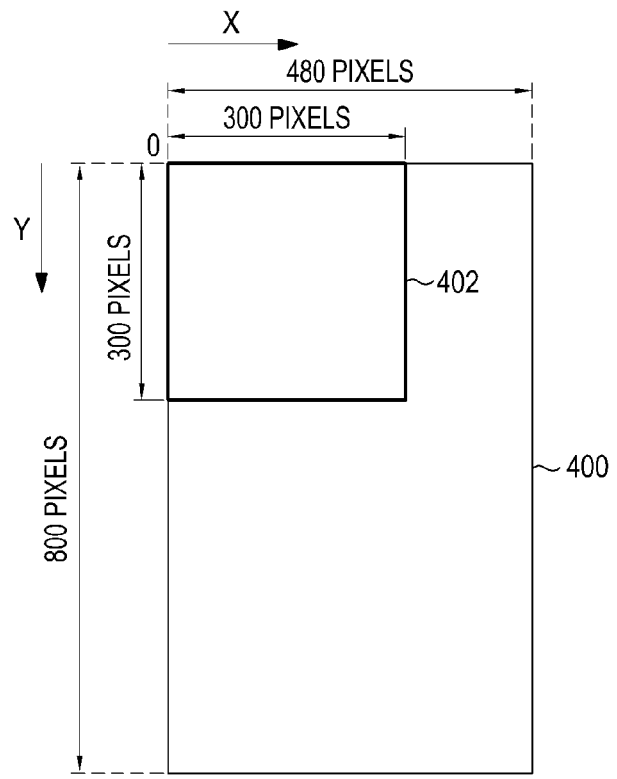
FIGS. 4A to 4C illustrate examples for defining overlay regions according to embodiments of the present invention.
Figure 4B:
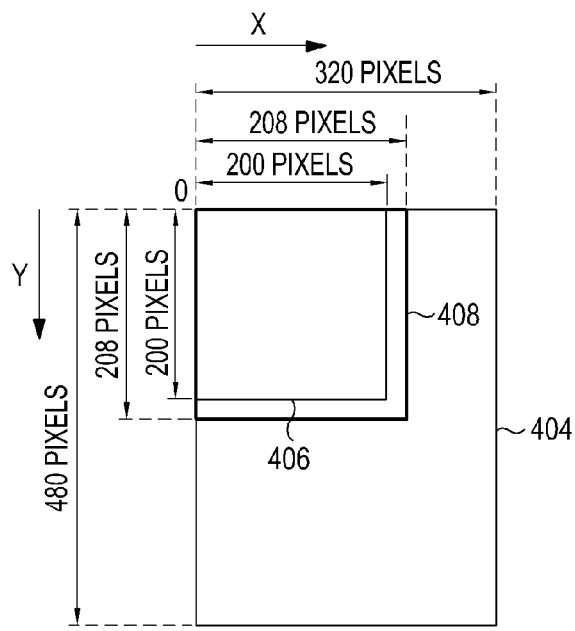
Figure 4C:
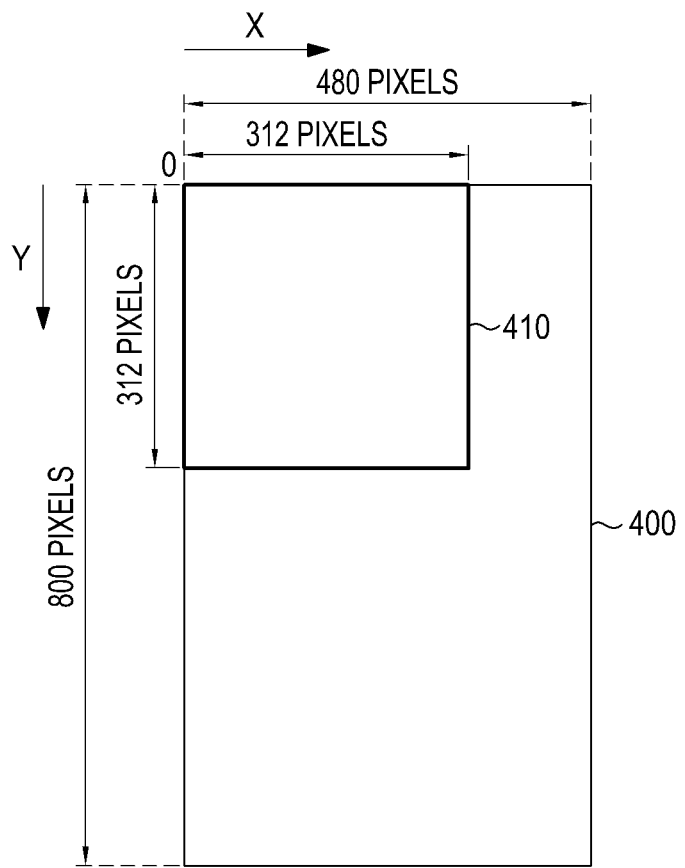

FIGS. 4A to 4C illustrate examples for defining overlay regions according to embodiments of the present invention. FIGS. 4A to 4C illustrate when the basic resolution of the application 102 is the WVGA and the physical resolution of the mobile device is the HVGA.

Referring to FIG. 3 and FIGS. 4A to 4C, the application 102 sets an overlay region, which the application 102 desires to generate based on the basic resolution in step 300, and queries the platform 104 about the overlay region desired to be generated based on the basic resolution in step 302. The overlay region which the application 102 desires to generate, that is, the overlay region queried to the platform 104 is illustrated in FIG. 4A as an example.

FIG. 4A illustrates an example in which the overlay region 402, which the application 102 desires to generate, is set as 300*300 (width*height) pixels based on 480*800 (width*height) pixels of a WVGA screen 400. That is, the overlay region 402 is set as 300*300 pixels within 480*800 pixels of the WVGA screen 400. A value defining the overlay region set as shown in FIG. 4A by the application 102 in step 300 becomes (X axis coordinate, Y axis coordinate, width, height)=(0, 0, 300, 300). The X axis coordinate and the Y axis coordinate indicate a reference position of a control region of a user interface, that is, a reference position of the overlay region 402 within the WVGA screen 400, and the origin (0, 0) corresponding to a vertex located at a left upper end is set as the reference position in FIG. 4A. The X axis coordinate and the Y axis coordinate correspond to numbers of pixels from the origin to the reference position, respectively. Accordingly, a value of the overlay region queried to the platform 104 by the application 102 in step 302 becomes (0, 0, 300, 300).

The platform 104 calculates in step 304 an approximate region satisfying the overlay region condition for the overlay region (0, 0, 300, 300) queried by the application 102 in step 302, and informs the application 102 of the approximate region in step 306. Hereinafter, it is assumed that the overlay region condition is limited such that a width and a height of the overlay region 402 after scaling are multiples of 16 and the X axis coordinate and the Y axis coordinate of the reference position are even numbers. An example of the approximate region calculated by the platform 104 is shown in FIG. 4B.

The platform 104 calculates the approximate region 408 satisfying the overlay region condition for a region 406 of 200*200 pixels scaled from 300*300 pixels, which correspond to the overlay region 402, according to the physical resolution of the mobile device. Since the WVGA corresponds to 480*800 pixels and the HVGA correspond to 320*480 pixels, WVGA width pixel: HVGA width pixel=480:320 and thus 3:2. Accordingly, the region 406 corresponding to 200*200 pixels scaled from the overlay region 402 in a ratio of 3:2 with respect to an HVGA screen 404 becomes a reference region of the approximate region calculated by the platform 104.

Numbers approximate to a width pixel 200 of the reference region 406 and satisfying a multiple of 16 are 192 and 208, and both the numbers 192 and 208 have the same difference of 8 from 200. Accordingly, the approximate regions calculated by the platform 104 are 192*192 pixels and 208*208 pixels. When two approximate regions are calculated in the foregoing manner, the platform 104 selects one from a wide approximate region and a narrow approximate region and then informs the application 102 of the selected approximate region, or informs the application 102 of both the approximate regions and then the application 102 can select one approximate region.

Accordingly, in processing the above instance in which there are two approximate regions, whether the application 102 or the platform 104 will select the one approximate region is preset. FIG. 4B illustrates an example in which 208*208 pixels are selected from 192*192 pixels and 208*208 pixels as the approximate region 408. Since the reference position of the overlay region 402 corresponds to (0, 0) and thus both X and Y axis coordinates are even numbers, the reference position of the approximate region 408 remains (0, 0). If any of the X and Y axis coordinates of the reference position of the overlay region 402 is an odd number, the platform 104 calculates an even number approximate to the odd number as the reference position of approximate region 408. If there are 2 approximate values, whether the application 102 or the platform 104 will select the one approximate value is preset.

Since the calculated 208*208 pixels of the approximate region 408 is calculated for the 200*200 pixels scaled in a ratio of 3:2, the platform 104 should inform the application 102 of an approximate region that has not been scaled. Accordingly, the platform 104 informs the application 102 of a value (0, 0, 312, 312) that has not been scaled among a value (0, 0, 208, 208) of the approximate region 408 in step 306. That is, the platform 104 converts 208 to 312 according to a 2:3 ratio corresponding to the scaling ratio 3:2, and informs the application 102 of the 2:3 ratio.

The application 102 generates in step 308 an overlay region corresponding to the approximate region received from the platform 104 in step 306, sets the overlay region in the input buffer 108. FIG. 4C illustrates that the application 102 generates an overlay region 410 of (0, 0, 312, 312) corresponding to the approximate region 408 received from the platform 104.

When the overlay region 410 corresponding to the approximate region 408 is generated by the application 102, the platform 104 displays an image of the overlay region 410 generated by the application 102 on the screen of the display by controlling the buffer unit 106 and the post processor 116 in step 310.

According to the present invention, an overlay region generated by the application satisfies an overlay region condition of the mobile device because the application receives an approximate region satisfying the overlay region condition of the mobile device from the platform and then generates the overlay region corresponding to the approximate region.

Therefore, the overlay region of the application can be generated regardless of a basic resolution of the application to be used in the mobile device and a physical resolution of the mobile device, thereby developing an application supporting one source code for multi resolutions. Further, a user of the mobile device can freely use applications according to the present invention regardless of various basic resolutions of the applications.

Although the above description has discussed detailed embodiments, various changes and modifications can be made thereto without departing from the technical spirit and scope of the present invention. For example, the foregoing describes the instance when the basic resolution of the application is the WVGA and the physical resolution of the mobile device is the HVGA, but the present invention can be applied when a different basic resolution of the application and a different physical resolution of the mobile device are used.

The embodiments of the present invention can be implemented in a form of hardware, software, or a combination thereof. For example, the software can be stored in volatile or nonvolatile storage devices such as a ROM (Read Only Memory) or a RAM (Random Access Memory), or optically or magnetically recordable and machine-readable storage media such as a CD (Compact Disc), a DVD (Digital Versatile Disc), a magnetic disc and magnetic tape. Accordingly, the present invention includes a program including a code for implementing the apparatus or the method stated in claims and a machine (such as a computer)-readable storage medium for storing the program. The program can be electronically transferred though an arbitrary medium such as a communication signal transmitted through wired or wireless connection, and the present invention includes it equivalents.

The mobile device can use a program for defining an overlay region by an application and a program for defining an overlay region by a platform in defining the overlay region by downloading the programs from a remotely located program providing apparatus (such as a server), respectively or installing and executing the programs. That is, when the program for defining the overlay region is installed in the mobile device, the program is executed in the mobile device and can provide a function of defining the overlay region. The program providing apparatus transmits the program to the mobile device automatically or in response to a transmission request for the program by the mobile device.

The program providing apparatus can additionally determine whether the mobile device subscribes to a service, and perform the identification of information on a user authentication and a payment. The program providing apparatus may include a communication unit for performing wired or wireless communication with the mobile device, a storing medium for storing the program, and a controller for transmitting the program to the mobile device by the communication unit. The storing medium can be located inside or outside the program providing apparatus.

While the present invention has been shown and described with reference to certain embodiments and drawings thereof, it will be understood by those skilled in the art that various changes in form and details may be made therein without departing from the spirit and scope of the invention as defined by the appended claims.

What is claimed is:

1. A method of defining an overlay region for an application in a user interface control region on a screen of a display in a mobile device, the method comprising:
    querying, by the application, a platform of the mobile device about an overlay region desired to be generated based on a basic resolution set in the application;
    receiving an approximate region associated with the queried overlay region from the platform; and
    generating an overlay region corresponding to the received approximate region,
    wherein the approximate region is approximate to the queried overlay region among the regions satisfying an overlay region condition, and the overlay region condition includes restrictive conditions for processing an image of the overlay region.

2. The method as claimed in claim 1, wherein the overlay region condition includes a condition restricted by a module for processing the image of the overlay region.

3. The method as claimed in claim 2, wherein the overlay regions and the approximate region are defined by an X axis coordinate and a Y axis coordinate indicating a reference position within the user interface control region and a width and a height of a corresponding region, respectively.

4. The method as claimed in claim 3, wherein the overlay region condition includes at least one of a condition limiting a width and a height of an overlay region after scaling performed according to a physical resolution of the mobile device and a condition limiting a reference position of the overlay region.

5. The method as claimed in claim 1, wherein the approximate region is selected by one of the platform and the application from among a plurality of candidate approximate regions scaled from the queried overlay region according to the physical resolution of the mobile device and subsequently modified to satisfy the overlay preset condition.

6. A method of defining an overlay region for an application in a user interface control region on a screen of a display in a mobile device, the method comprising:
    calculating, when a platform of the mobile device is queried about an overlay region desired to be generated based on a basic resolution set in the application from the application, an approximate region associated with the queried overlay region and informing the application of the approximate region; and
    displaying, by the platform, when an overlay region corresponding to the approximate region is generated by the application, the generated overlay region on the screen of the display,
    wherein the approximate region is approximate to the queried overlay region among the regions satisfying an overlay region condition, and the overlay region condition includes restrictive conditions for processing an image of the overlay region.

7. The method as claimed in claim 6, wherein the overlay region condition includes a condition limited by a module for processing the image of the overlay region.

8. The method as claimed in claim 7, wherein the overlay regions and the approximate region are defined by an X axis coordinate and a Y axis coordinate indicating a reference position within the user interface control region and a width and a height of a corresponding region, respectively.

9. The method as claimed in claim 8, wherein the overlay region condition includes at least one of a condition limiting a width and a height of an overlay region after scaling performed according to a physical resolution of the mobile device and a condition limiting a reference position of the overlay region.

10. The method as claimed in claim 6, wherein the approximate region is selected by one of the platform and the application from among a plurality of candidate approximate regions scaled from the queried overlay region according to the physical resolution of the mobile device and subsequently modified to satisfy the overlay preset condition.

11. A method of defining an overlay region in a user interface control region on a screen of a display in a mobile device by an application, the method comprising:
    querying, by the application, a platform of the mobile device about an overlay region desired to be generated based on a basic resolution set in the application;
    calculating, by the platform, an approximate region associated with the queried overlay region and informing the application of the approximate region;
    generating, by the application, an overlay region corresponding to the approximate region; and
    displaying, by the platform, the generated overlay region on the screen,
    wherein the approximate region is approximate to the queried overlay region among the regions satisfying an overlay region condition. and the overlay region condition includes restrictive conditions for processing an image of the overlay region.

12. The method as claimed in claim 11, wherein the overlay region condition includes a condition limited by a module for processing the image of the overlay region.

13. The method as claimed in claim 12, wherein the overlay regions and the approximate region are defined by an X axis coordinate and a Y axis coordinate indicating a reference position within the user interface control region and a width and a height of a corresponding region, respectively.

14. The method as claimed in claim 13, wherein the overlay region condition includes at least one of a condition limiting a width and a height of an overlay region after scaling performed according to a physical resolution of the mobile device and a condition limiting a reference position of the overlay region.

15. The method as claimed in claim 11, wherein the approximate region is selected by one of the platform and the application from among a plurality of candidate approximate regions scaled from the queried overlay region according to the physical resolution of the mobile device and subsequently modified to satisfy the overlay preset condition.

16. An apparatus for defining an overlay region for an application in a user interface control region on a screen of a display in a mobile device, the apparatus comprising:
    a controller configured to execute the application and a platform of the mobile device such that:
        the application queries a platform of the mobile device about an overlay region desired to be generated based on a basic resolution set in the application,
        the platform calculates an approximate region associated with the queried overlay region and informing the application of the approximate region, and
        the application generates an overlay region corresponding to the approximate region; and
    a display for displaying the generated overlay region on the screen,
    wherein the approximate region is approximate to the queried overlay region among the regions satisfying an overlay region condition, and the overlay region condition includes restrictive conditions for processing an image of the overlay region.

17. The apparatus as claimed in claim 16, wherein the controller controls such that the application queries the platform about an overlay region desired to be generated based on a basic resolution set in the application, and the platform calculates the approximate region satisfying the overlay region condition for the queried overlay region and informs the application of the approximate region.

18. The apparatus as claimed in claim 17, wherein the overlay region condition includes a condition limited by a module for processing the image of the overlay region.

19. The apparatus as claimed in claim 18, wherein the overlay regions and the approximate region are defined by an X axis coordinate and a Y axis coordinate indicating a reference position within the user interface control region and a width and a height of a corresponding region, respectively.

20. The apparatus as claimed in claim 19, wherein the overlay region condition includes at least one of a condition limiting a width and a height of an overlay region after scaling performed according to a physical resolution of the mobile device, and a condition limiting a reference position of the overlay region.

21. The method as claimed in claim 16, wherein the approximate region is selected by one of the platform and the application from among a plurality of candidate approximate regions scaled from the queried overlay region according to the physical resolution of the mobile device and subsequently modified to satisfy the overlay preset condition.

* * * * *